United States Patent
Manhart et al.

(10) Patent No.: US 9,006,571 B2
(45) Date of Patent: Apr. 14, 2015

(54) BUS SYSTEM CONNECTING BUS BARS AND A METHOD OF CONNECTING BUS BARS

(71) Applicant: SAI Advanced Power Solutions, Elmhurst, IL (US)

(72) Inventors: James S. Manhart, Wheaton, IL (US); John F. Ryan, Schaumburg, IL (US)

(73) Assignee: SAI Advanced Power Solutions, Elmhurst, IL (US)

( * ) Notice: Subject to any disclaimer, the term of this patent is extended or adjusted under 35 U.S.C. 154(b) by 40 days.

(21) Appl. No.: 14/086,637

(22) Filed: Nov. 21, 2013

(65) Prior Publication Data

US 2014/0138149 A1    May 22, 2014

Related U.S. Application Data

(60) Provisional application No. 61/729,206, filed on Nov. 21, 2012.

(51) Int. Cl.
| | |
|---|---|
| *H02G 5/00* | (2006.01) |
| *H01R 4/00* | (2006.01) |
| *H02G 3/06* | (2006.01) |
| *H02G 15/08* | (2006.01) |
| *H01B 5/02* | (2006.01) |
| *H01R 4/60* | (2006.01) |
| *H02B 1/20* | (2006.01) |
| *H02G 5/02* | (2006.01) |
| *H02B 1/21* | (2006.01) |

(52) U.S. Cl.
CPC ............. *H02G 5/02* (2013.01); *Y10T 29/49117* (2015.01); *H02B 1/21* (2013.01)

(58) Field of Classification Search
CPC ....... H02G 5/002; H02G 5/005; H02G 5/007; H02G 5/02; H02G 5/025
USPC ......... 174/68.2, 70 B, 71 B, 72 B, 72 TR, 86, 174/87, 88 B, 94 R, 99 B, 129 B, 133 B, 174/149 B; 439/212, 213; 361/648, 649, 361/650, 651
See application file for complete search history.

(56) References Cited

U.S. PATENT DOCUMENTS

| | | | |
|---|---|---|---|
| 1,691,422 A | 11/1928 | Aalborg | |
| 1,840,887 A | 1/1932 | De Mask | |
| 2,297,170 A | 9/1942 | Rudd | |
| 2,356,708 A * | 8/1944 | Sileck ........................ | 174/129 B |
| 2,430,510 A | 11/1947 | Hoye | |
| 2,468,614 A | 4/1949 | Carlson | |
| 2,606,957 A | 8/1952 | Rypinski | |
| 2,800,557 A * | 7/1957 | Swain ......................... | 174/84 R |

(Continued)

*Primary Examiner* — Chau N Nguyen
*Assistant Examiner* — Roshin Varghese
(74) *Attorney, Agent, or Firm* — Leydig, Voit & Mayer, Ltd.

(57) ABSTRACT

According to an aspect of the disclosure, there is provided an electrical distribution bus system that includes first and second bus bars, a dielectric insulator, and at least one fastener coupling the bus bars and dielectric insulator. Each of the bus bars includes an elbow portion from which a pair of straight portions extends at elbow angles, the straight portions being disposed at right angles to each other. The dielectric insulator has a length and a width, the width being no greater than twice the length, the length extending perpendicularly between the elbow portions. The fastener couples the dielectric insulator between the bus bars, the dielectric insulator electrically insulating the first and second bus bar from one another.

20 Claims, 7 Drawing Sheets

(56) References Cited

U.S. PATENT DOCUMENTS

| | | | |
|---|---|---|---|
| 2,877,289 A | 3/1959 | Schymik | |
| 2,913,513 A | 11/1959 | Dyer et al. | |
| 2,942,157 A | 6/1960 | Davis | |
| 2,997,627 A | 8/1961 | Ellegood | |
| 3,178,668 A | 4/1965 | Weimer et al. | |
| 3,210,716 A | 10/1965 | Meacham | |
| 3,213,183 A | 10/1965 | Weimer et al. | |
| 3,243,663 A | 3/1966 | Rowe | |
| 3,346,687 A | 10/1967 | Giger et al. | |
| 3,356,906 A | 12/1967 | Lamb et al. | |
| 3,411,042 A | 11/1968 | Klein | |
| 3,730,971 A | 5/1973 | Durham et al. | |
| 4,401,846 A * | 8/1983 | Sato et al. | 174/149 B |
| 4,722,703 A | 2/1988 | Hufnagl | |
| 5,053,918 A | 10/1991 | Norden | |
| 5,124,881 A | 6/1992 | Motoki | |
| 5,140,499 A | 8/1992 | Amano et al. | |
| 5,142,439 A | 8/1992 | Huggett et al. | |
| 5,152,698 A | 10/1992 | Juhlin et al. | |
| 5,157,584 A * | 10/1992 | Rowe | 174/129 B |
| 5,183,971 A | 2/1993 | Lafosse et al. | |
| 5,847,321 A | 12/1998 | Carle et al. | |
| 6,024,589 A | 2/2000 | Hahn, IV et al. | |
| 6,040,976 A | 3/2000 | Bruner et al. | |
| 6,111,745 A | 8/2000 | Wilkie, II et al. | |
| 6,205,017 B1 | 3/2001 | Wilkie, II et al. | |
| 6,629,854 B2 | 10/2003 | Murakami | |
| 6,748,651 B2 | 6/2004 | Miyajima et al. | |
| 6,762,362 B1 | 7/2004 | Cavanaugh et al. | |
| 7,414,828 B2 | 8/2008 | Birner | |
| 7,718,895 B2 | 5/2010 | Rodriguez | |
| 7,952,025 B2 | 5/2011 | Diaz et al. | |
| 7,952,026 B2 | 5/2011 | Ramsey | |
| 8,173,899 B2 | 5/2012 | Doring et al. | |
| 8,284,541 B2 | 10/2012 | Shea et al. | |
| 8,305,739 B2 | 11/2012 | Dozier | |

* cited by examiner

BUS SYSTEM CONNECTING BUS BARS AND A METHOD OF CONNECTING BUS BARS

FIELD OF THE DISCLOSURE

This disclosure relates to bus system and, more particularly, to a bus system which allows for a break in the main bus to facilitate attachment of a device, while keeping the main bus on the same centerline.

BACKGROUND OF THE DISCLOSURE

Bus bars are utilized in electrical power distribution systems to conduct electricity, typically from an electrical panel board. To allow heat to dissipate relatively efficiently, bus bars are typically either flat strips or hollow tubes to provide a relatively high surface area to cross-sectional area ratio. Bus bars may be supported on insulators within a system. In U.S. Pat. No. 2,606,957 to Rypinski, sections of bus bars are completely surrounded with insulation. While Rypinski indicates that his construction is less expensive to manufacture than prior arrangements, the Rypinski arrangement does not offer flexibility in design and fabrication desirable for current systems.

SUMMARY OF THE DISCLOSURE

According to an aspect of the disclosure, there is provided an electrical distribution bus system that includes first and second bus bars, a dielectric insulator, and at least one fastener coupling the bus bars and dielectric insulator.

The first bus bar includes a first elbow portion from which a first pair of straight portions extends. The first portion of the first pair extends at a first elbow angle to the first elbow portion, and the second portion of the first pair extends at a second elbow angle to the first elbow portion. The first and second portions of the first pair are disposed in respective planes disposed at right angles to one another.

The second bus bar includes a second elbow portion from which a second pair of straight portions extends. The first portion of the second pair extends at a third elbow angle to the second elbow portion, and the second portion of the second pair extends at a fourth elbow angle to the second elbow portion. The first and second portions of the second pair are disposed in respective planes disposed at right angles to one another.

The dielectric insulator has a length and a width. The length extends perpendicularly between the elbow portions. The fastener couples the dielectric insulator between the bus bars, the dielectric insulator electrically insulating the first and second bus bar from one another.

According to another aspect of the disclosure, the electrical distribution bus system includes a plurality of such bus bars and a plurality of such dielectric insulators. According to another embodiment, the width is no greater than twice the length.

According to a further aspect of the disclosure, at least one of the first and second bus bars includes a plurality of planar plates extending parallel to one another separated by one or more gaps. More particularly, both of the bus bars include a plurality of planar plates extending parallel to one another separated by one or more spaces.

According to yet another aspect of the disclosure, the first and second elbow angles are substantially on the order of 135°. According to another aspect of the disclosure, one of the straight portions of the first bus bar and one of the straight portions of the second bus bar are disposed along the same centerline.

According to yet another aspect of the disclosure, the dielectric insulator has a length on the order of or no greater than three inches. According to other aspects, the dielectric has a width that is less than the length, and/or is formed of at least one of glass, porcelain, or thermoset plastic material.

According to a further aspect of the disclosure, the dielectric insulator includes a bore and at least one metal insert at least partially disposed within the bore. According to other aspects of the disclosure, the dielectric insulator includes at least two metal inserts at least partially disposed within the bore, the inserts being noncontiguous within the bore.

According to other aspects of the disclosure, a first fastener couples the first bus bar to the dielectric insulator, and a second fastener couples the second bus bar to the dielectric insulator, and/or the fasteners are threaded, and there is further provided first and second nuts that engage the first and second fasteners, and/or washers are disposed about the fasteners.

According to another aspect of the disclosure, there is provided a method of assembling an electrical distribution bus system including the steps of providing at least first and second bus bars as described above, disposing a dielectric insulator having a length and a width with the length extending perpendicularly between the elbow portions of the first and second bus bars, the width being no greater than twice the length, and engaging one fastener to couple the dielectric insulator between said bus bars, the dielectric insulator electrically insulating the first and second bus bar from one another. According to another aspect of the disclosure, there is provided a dielectric insulator including at least one bore and at least two metal inserts at least partially disposed within the bore, the inserts being noncontiguous within the bore, and first and second fasteners extending from the bore, coupling the first fastener to the first bus bar, and coupling the second fastener to the second bus bar. According to yet another aspect, a step includes inserting the first fastener through a bore in the first bus bar and engaging a first of the two metal inserts disposed within the bore, and inserting the second fastener through a bore in the second bus bar and engaging a second of the two metal inserts disposed within the bore.

BRIEF DESCRIPTION OF THE DRAWING(S)

DETAILED DESCRIPTION OF EMBODIMENTS

Figure 1:
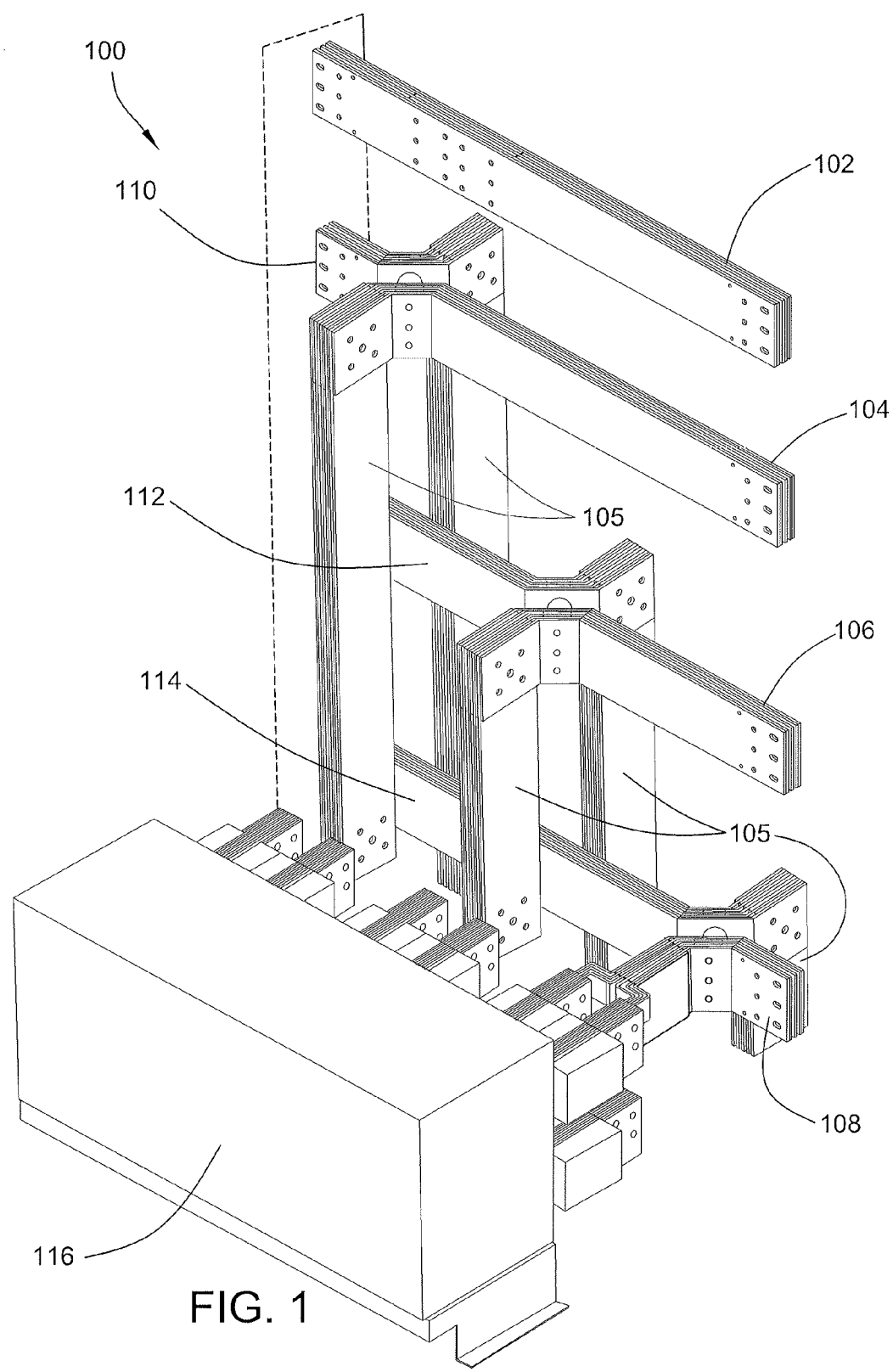
FIG. 1 shows an isometric view of the bus system with a break in the main bus and a device that ties into the main bus.

The present disclosures relates to an arrangement for connecting bus bars and a method of connecting bus bars. The bus system 100 illustrated in FIG. 1, for example, is an apparatus that allows a break in the main bus (shown in phantom), while keeping the main bus (shown in phantom) on the same centerline. The break in the main bus (shown in phantom) allows a breaker, utility current transformer, or any other device 116 to tie into the main bus (shown in phantom) by tying the three line side bus bars 110, 112, 114 and the three load side bus bars 104, 106, 108 (see FIG. 1); alternately, a bus bar extension 105 may be connected to a load or line side bus bar 104, 106, 108, 110, 112, 114; a neutral tie in bar 103 may tie into the neutral bus 102 (see FIG. 2).

In the embodiment illustrated in FIG. 1, for example, if a three phase electrical power system is used, then the system has three load side bus bars 104, 106, 108 and three line side bus bars 110, 112, 114 for carrying the alternating current and a neutral bus bar 102. The load and line side bus bars 104, 106, 108, 110, 112, 114 can be a variety of shapes such as an overall "L" shape. Since the main bus (shown in phantom) continues on the same centerline despite the break in the main bus (shown in phantom), bus bars continuing along the same centerline carry the same phase. In other words, load side bus 104 and line side bus 110 carry the same phase; load side bus bar 106 and line side bus bar 112 carry the same phase; load side bus bar 108 and line side bus bar 114 carry the same phase; and neutral bus bar 102 passes through the system unbroken. Those of skill in the art will appreciate that a number of different geometries for the bus system 100 are possible, such as, for example, those shown in FIGS. 1 and 2. Similarly, if there are a different number of phases then there could be more or less line and load side bus bars.

Figure 7:
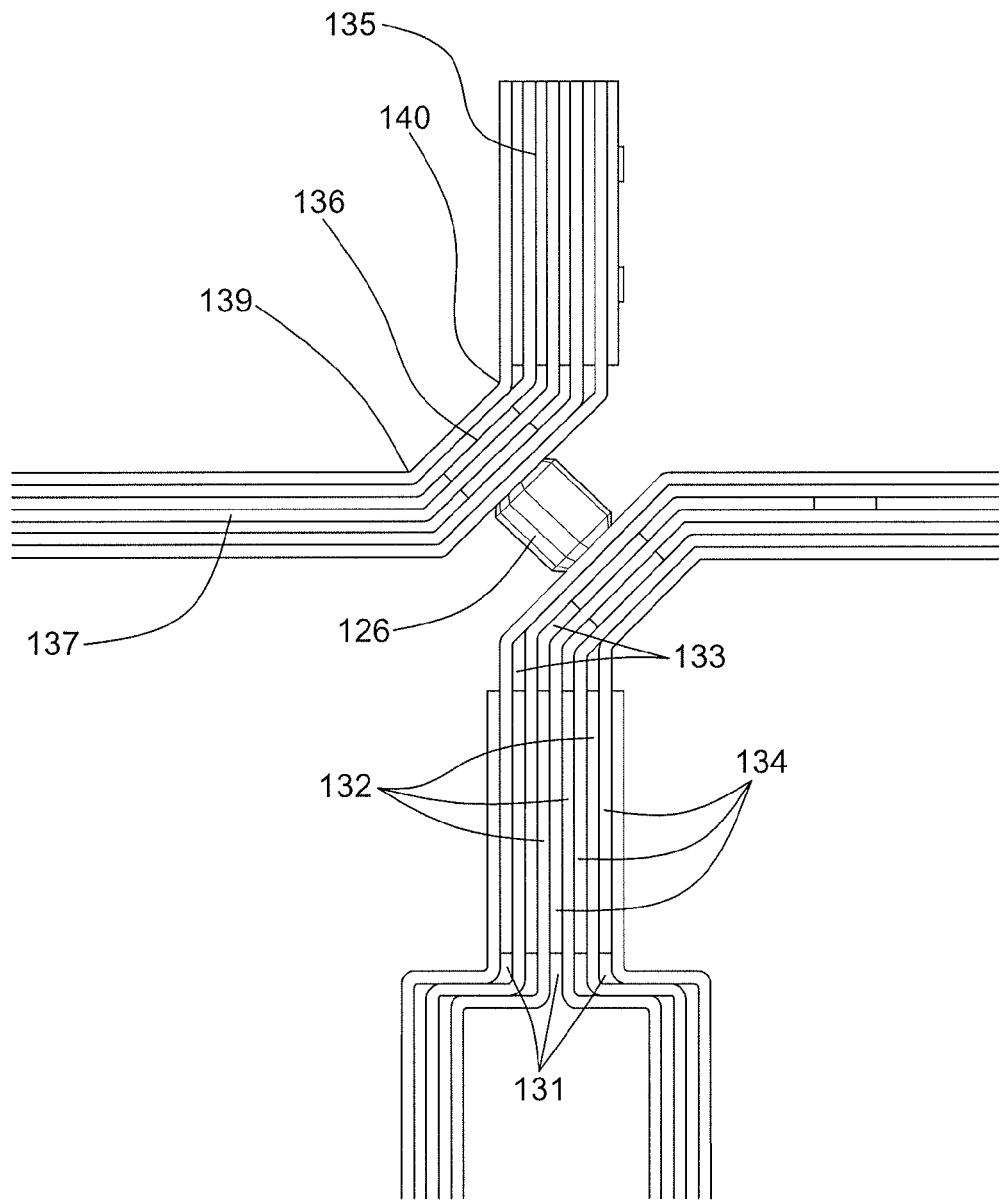
FIG. 7 shows an enlarged fragmentary top view of a bus bar.

According to this disclosure, bus bars may include angled portions that facilitate connection at a dielectric insulator, yielding advantages in both manufacturing and assembly. More specifically, in the embodiment of FIGS. 1 and 3-7, the bus bars 104, 106, 108, 110, 112, 114 have two substantially straight portions 135, 137 on both ends of an elbow portion 136 connected at elbow angles 139 and 140 (see FIG. 7, in particular). The lengths of the substantially straight portions 135, 137 can be a variety of lengths and do not need to be the same length. The elbow angle 139, 140 can be a variety of suitable angles. Additionally, the elbow angle 139 and the elbow angle 140 can be the same angle or can be a different angle. Together, the combination of the straight portions 135, 137 with the elbow portion 136 and elbow angles 139, 140 will result in the two straight portions 135, 137 being disposed at an angle to one another. While the relative angle of the straight portions 135, 137 to one another may be any desired angle, typically, the straight portions 135, 137 will ultimately be disposed at a 90° angle to one another as a result of the inclusion of the elbow portion 136 and the pair of elbow angles 139, 140. That is, as will be understood by those of skill in the art, the straight portions 135, 137 may be disposed in planes at right angles to one another.

In the illustrated embodiment, an angle of 135° can be used for both elbow angles 139 and 140. Other angles are within the purview of the invention, for example, that a similar disposal of the straight portions 135, 137 would result from one elbow angle 125°, for example, and the other elbow angle of 145°. In any event, in an embodiment the sum of the elbow angles 139 and 140 for a bus bar will be equal to 270° in order to dispose the straight portions 135, 137 of the bus bar within planes at right angles, that is, at 90° to one another. It will be appreciated, however, that the utilization of the same angle at both of elbow angles 139, 140 provides symmetry to the bus bar that may make assembly and manufacturing of the bus system 100 more efficient. For example, by utilizing the same elbow angle 139, 140, levels of inventory may be maintained at an efficient minimum, and opportunities for errors in manufacturing and assembly may be minimized.

The elbow portion 136 of a line side bus bar 110, 112, 114 is mechanically connected and electrically insulated from the elbow portion 136 of an adjacent load side bus bar 104, 106, 108 by at least one dielectric insulator 126 which abuts the elbow portion 136. The dielectric insulator 126 can connect to a load side bus bar 104, 106, 108 and a line side bus bar 110, 112, 114 of the same phase in any suitable way, such as with a fastener 127 (see FIG. 3). If a fastener 127 is used, the fastener 127 can extend entirely through the dielectric insulator 126, or two fasteners 127 can be used on both sides of the dielectric insulator 126 to secure it to the elbow portions 136.

The dielectric insulator 126 extends between elbow portions 136, rather than completely around elbow portions 136. The dielectric insulator 126 can be any suitable length, but is preferably at least two inches long. For the purposes of this disclosure, when referring to the dielectric insulator, the term "length" will mean the thickness of the dielectric insulator disposed in a direction that is perpendicular to and extends between the elbow portions and the term "width" will mean the thickness of the dielectric insulator in a direction parallel to the elbow portions in the assembled state. The dielectric insulator 126 can come in a variety of shapes, such as cylindrical. In the embodiment illustrated in FIG. 8, for example, the dielectric insulator 126 has a barrel-like shape. In some embodiments, the width will be no greater than twice the length of the dielectric insulator, and in some embodiments, the width will be no greater than the length of the dielectric insulator. The dielectric insulator can be made of a material such as glass, porcelain, thermoset plastic or any suitable material.

Figure 8:
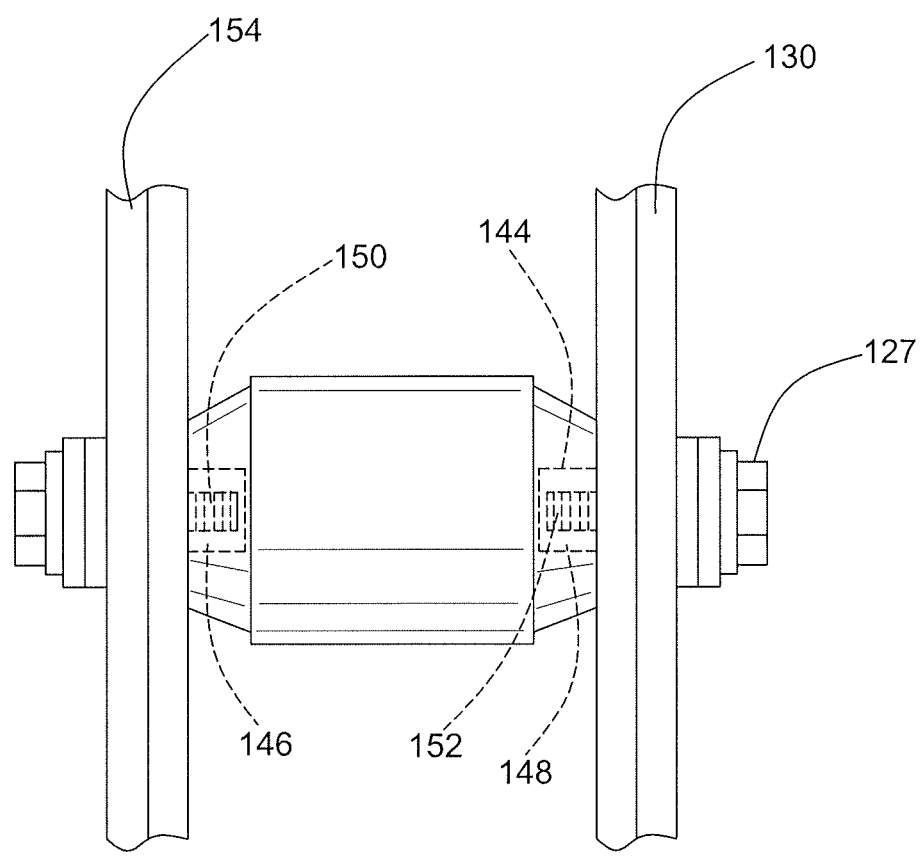
FIG. 8 is a plan view of an insulated connection.

The dielectric insulator 126 may include one or more bores 144 that receive one or more metal inserts 146, 148 or the like into which one or more fasteners 127 may extend. In the embodiment of FIG. 8, the dielectric insulator 126 includes a pair of threaded metal inserts 146, 148 into which a respective pair of threaded fasteners 150, 152 are threaded. The fasteners 150, 152 extend through respective portions of a pair of bus bars 154, 156 into the metal inserts 146, 148. In the illustrated embodiment, the fasteners 150, 152 are bolts that include enlarged heads 158, 160 disposed along an opposite sides of the bus bars 154, 156. One or more washers 162 may be provided about the fasteners 150, 152 in order to distribute forces exerted by the engagement of the fasteners 150, 152 with the dielectric insulator 126, and to minimize the likelihood of loosening of the respective parts. It will be appreciated by those of skill in the art that, because the metal inserts 146, 148 are not contiguous through the dielectric insulator 126, and the fasteners 150, 152 do not engage one another, the dielectric insulator 126 insulates one bus bar 154, 156 from the other.

Alternate arrangements of fasteners are envisioned. By way of example only, a double threaded rod could be threaded into the bore, and a nut engaged with the end of the rod extending through the bus bar, or the insert could include or be unitarily formed with a protruding threaded rod that could be similarly engaged with a nut.

The bus bars 102, 104, 105, 106, 108, 110, 112, 114 can be made of any suitable design of any suitable material, and fabricated by any suitable method. For example, the bus bars 102, 104, 105, 106, 108, 110, 112, 114 can be made from a single piece of extruded conductive material or from metal planar plates or strips 132, 134 which can be assembled to create a bus bar. The conductive material could be copper or any other suitable material. The bus bars 102, 104, 105, 106, 108, 110, 112, 114 can have a cross section defined by a width and thickness and have a length which is generally substantially longer than the width or thickness. The cross section could be a variety of geometries, such as rectangular.

The metal strips 132, 134 can be stacked adjacent one another, or with an appropriate gap 131, 133 in between the metal strips 132, 134 to accommodate the connection to an extending metal strip. Typically, the metal strips 132, 134 will be stacked with a gap 131, 133 that is equal to the thickness of the metal strips 132, 134 to which it will be coupled. Coupled metal strips may be disposed linearly, or at an angle to one another. At an end portion or anywhere along the length of the metal strips 132, 134 the metal strips 132, 134 overlap such that the metal strips 132 fit into the gap 133 between the metal strips 134, and the metal strips 134 fit into the gap 131 between metal strips 132. The metal strips 132, 134 can then be attached together by any suitable means, such as by welding, using fasteners, or clamping. The portion of the strips 132, 134 where there is no overlap provide gaps 131, 133 which reduces the amount of conductive material used, allows for more effective transfer of heat, and reduced skin effect.

Figure 2:
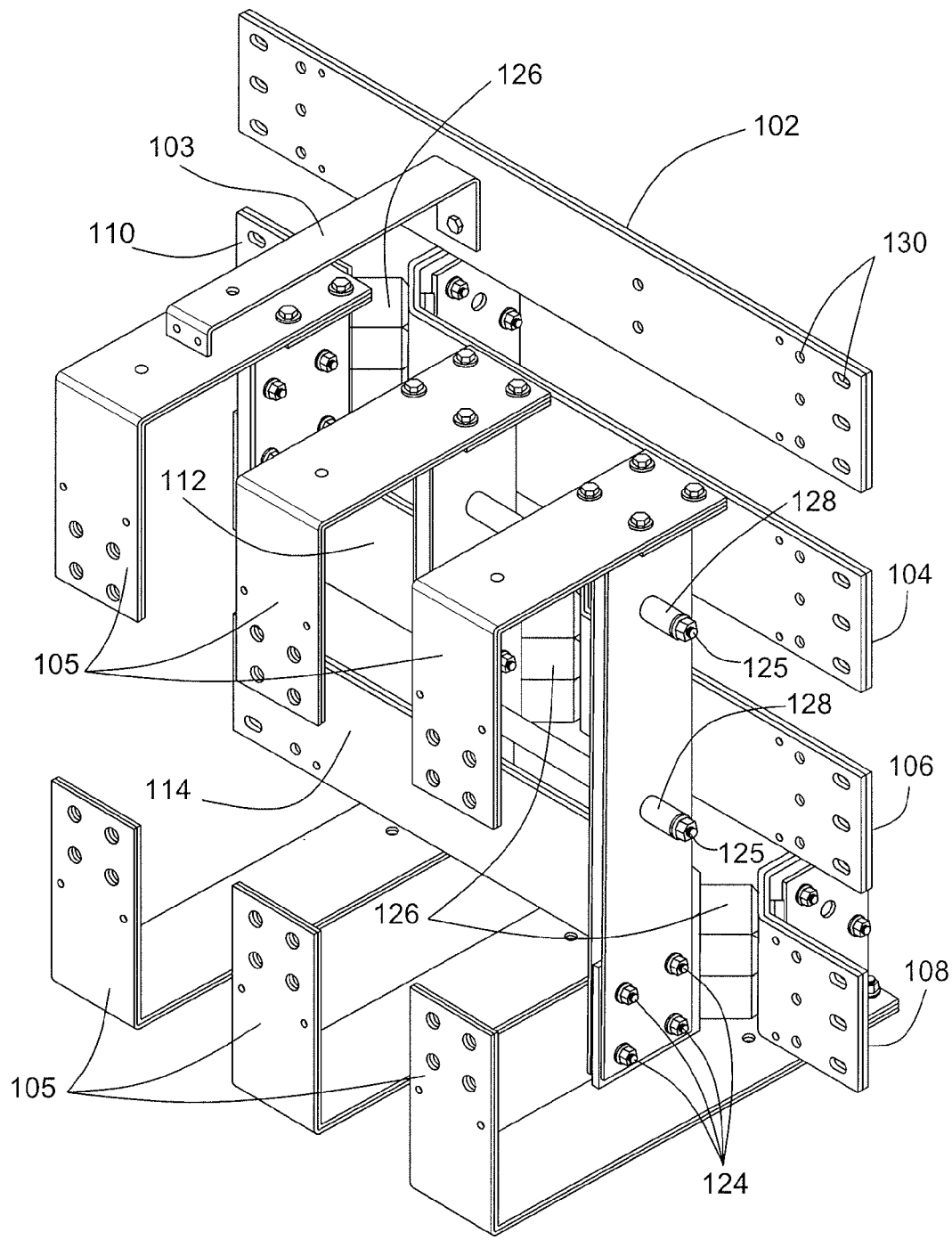
FIG. 2 shows an isometric view of a second embodiment of the bus system with a break in the main bus.
Figure 3:
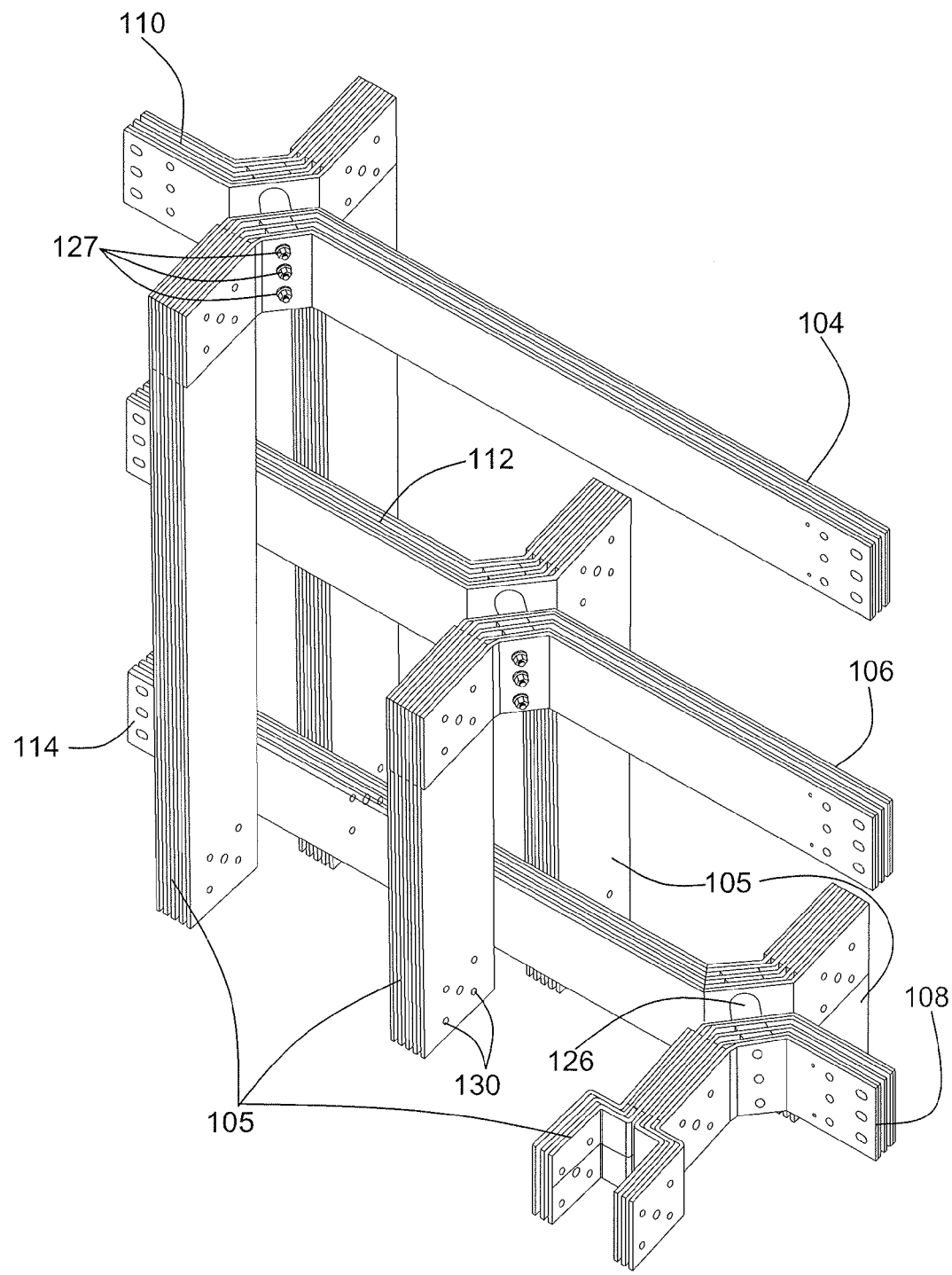
FIG. 3 shows an isometric view of the bus system of FIG. 1 without the device.
Figure 4:
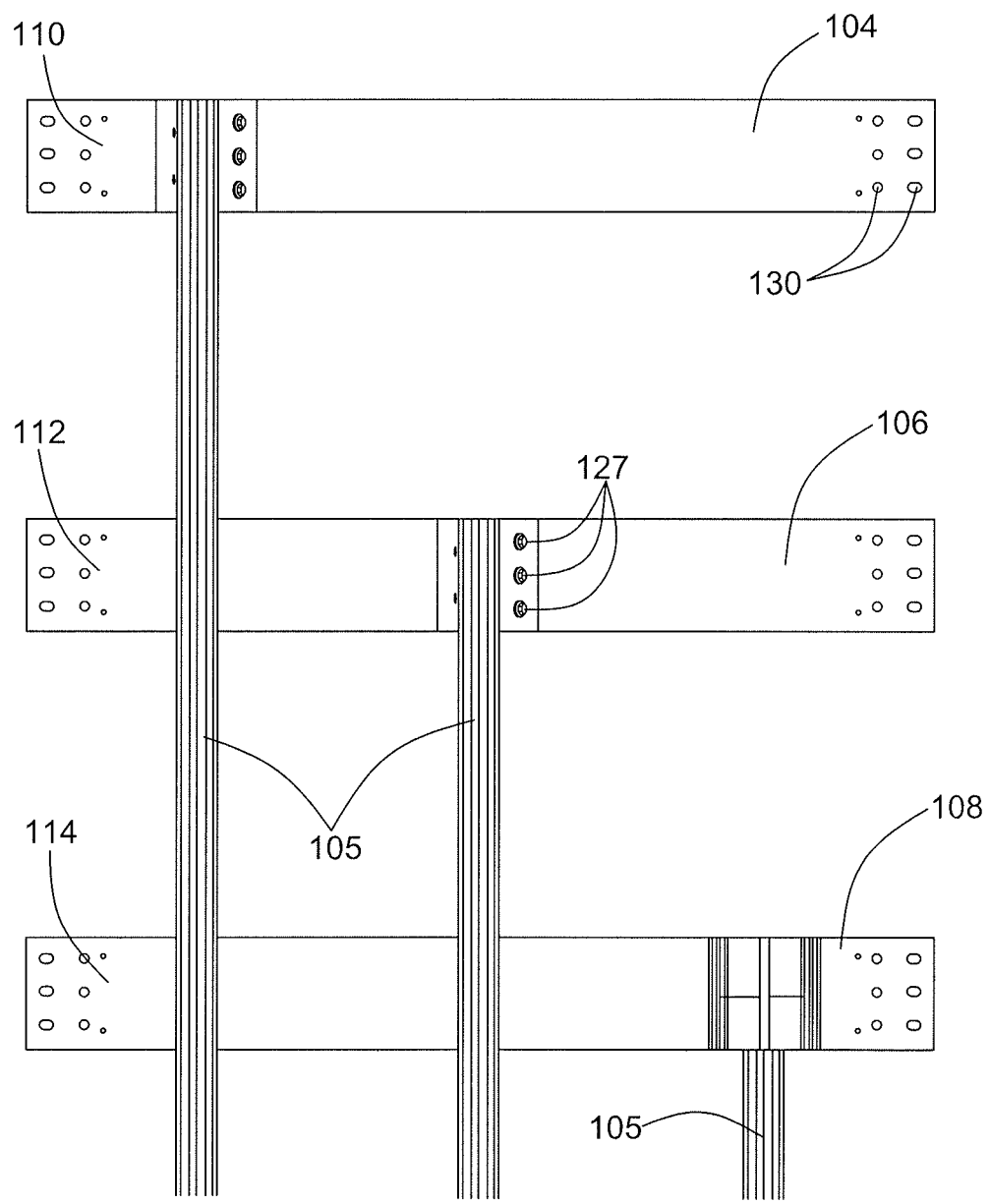
FIG. 4 shows a front view of the bus system of FIG. 3.
Figure 5:
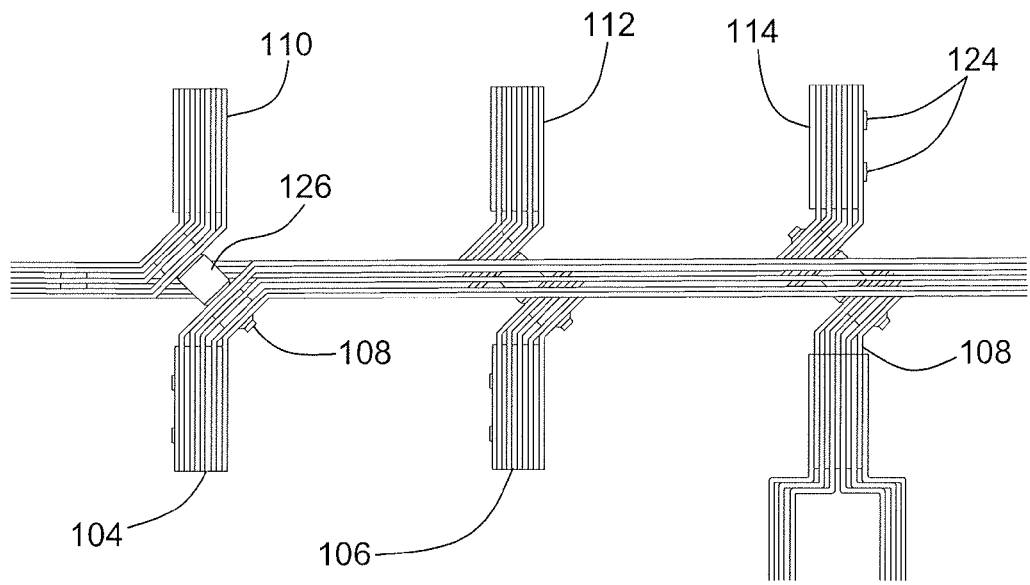
FIG. 5 shows a top view of the bus system of FIG. 3.
Figure 6:
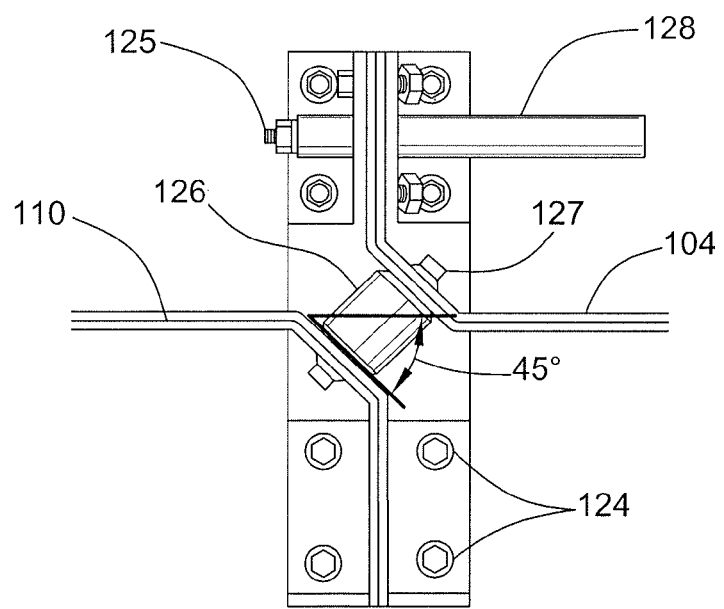
FIG. 6 shows an enlarged top view of an insulated connection of the elbow of a load side bus bar and the elbow of a line side bus bar.

Bus bars 102, 104, 105, 106, 108, 110, 112, 114 can have holes 130 through them at various locations to easily attach additional lengths of bus bar, such as bus bar extension 105 to provide the desired geometry, such as shown in FIGS. 1 and 2. If a bus bar extension 105 is used, then a dielectric insulator 128 can be used to provide electrical insulation and mechanical support between two extensions, such as shown in FIG. 2. The holes 130 and a fastener 124 can also be used to attach a dielectric insulator 126, connect a bus bar 102, 104, 105, 106, 108, 110, 112, 114 to a device 116, or to attach two bus bars, such as load side bus bar 104 and bus bar extension 105.

It will be appreciated by those of skill in the art that the disclosed arrangement may yield efficiencies in assembly and minimize material costs associated with fabrication of both the dielectric and the bus bars.

INDUSTRIAL APPLICABILITY

Embodiments of the disclosed bus system 100 offer numerous improvements over standard bus systems found in the prior art. By utilizing elbow portions 136 that present like angles at the straight portions 135, 137, economies may be obtained in fabrication and warehousing in some embodiments. Additionally, the use of standardized fasteners, as well as dielectric insulators 126, some embodiments of the disclosed bus system 100 may be efficiently and accurately assembled to desired specifications. Moreover, some embodiments of the bus system 100 utilize less conductive material and may be are more efficient at transferring heat than traditional bus bars.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. An electrical distribution bus system comprising:
at least a first bus bar, the first bus bar including a first elbow portion from which a first pair of straight portions extends, a first portion of said first pair extending at a first elbow angle to the first elbow portion, a second portion of said first pair extending at a second elbow angle to the first elbow portion, and the first and second portions of the first pair being disposed in respective planes disposed at right angles to one another,
at least a second bus bar, the second bus bar including a second elbow portion from which a second pair of straight portions extends, a first portion of said second pair extending at a third elbow angle to the second elbow portion, and a second portion of said second pair extending at a fourth elbow angle to the second elbow portion, and the first and second portions of the second pair being disposed in respective planes disposed at right angles to one another,
a dielectric insulator having a length and a width, the length extending perpendicularly between said elbow portions, and
at least one fastener coupling the dielectric insulator between said bus bars, the dielectric insulator electrically insulating the first and second bus bar from one another.

2. The electrical distribution bus system of claim 1 wherein at least one of said first and second bus bars include a plurality of planar plates extending parallel to one another separated by one or more gaps.

3. The electrical distribution bus system of claim 2 wherein the first bus bar including a plurality of planar plates extending parallel to one another separated by one or more spaces, the second bus bar including a plurality of planar plates extending parallel to one another separated by one or more spaces.

4. The electrical distribution bus system of claim 1 wherein the first and second elbow angles are substantially on the order of 135°.

5. The electrical distribution bus system of claim 1 wherein one of the straight portions of the first bus bar and one of the straight portions of the second bus bar are disposed along the same centerline.

6. The electrical distribution bus system of claim 1 wherein the dielectric insulator is formed of at least one of glass, porcelain, or thermoset plastic material.

7. The electrical distribution bus system of claim 1 wherein the dielectric insulator has a length on the order of two inches.

8. The electrical distribution bus system of claim 1 wherein the dielectric insulator has a length of no greater than three inches.

9. The electrical distribution bus system of claim 1 wherein the dielectric has a width that is less than the length.

10. The electrical distribution bus system of claim 1 comprising a plurality of bus bars and a plurality of dielectric insulators.

11. The electrical distribution bus system of claim 1 wherein the dielectric insulator includes a bore and at least one metal insert at least partially disposed within the bore.

12. The electrical distribution bus system of claim 1 wherein the dielectric insulator includes at least two metal inserts at least partially disposed within the bore, the inserts being noncontiguous within the bore.

13. The electrical distribution bus system of claim 12 including a first fastener that couples the first bus bar to the dielectric insulator, and a second fastener that couples the second bus bar to the dielectric insulator.

14. The electrical distribution bus system of claim 13 wherein the first and second fasteners are threaded bolts that extend through the first and second bus bars, respectively, and into the dielectric insulator.

15. The electrical distribution bus system of claim 14 further including at least one washer disposed about the first fastener and adjacent an enlarged head of the first fastener, and at least one washer disposed about the second fastener and adjacent an enlarged head of the second fastener.

16. The electrical distribution bus system of claim 13 wherein the first and second elbow angles are substantially on the order of 135°.

17. The electrical distribution bus system of claim 1 including a first fastener that couples the first bus bar to the dielectric insulator, and a second fastener that couples the second bus bar to the dielectric insulator.

18. A method of assembling an electrical distribution bus system, the method comprising the steps of:

providing at least a first bus bar, the first bus bar including a first elbow portion from which a first pair of straight portions extends, a first portion of said first pair extending at a first elbow angle to the first elbow portion, a second portion of said first pair extending at a second elbow angle to the first elbow portion, and the first and second portions of the first pair being disposed in respective planes disposed at right angles to one another, providing at least a second bus bar, the second bus bar including a second elbow portion from which a second pair of straight portions extends, a first portion of said second pair extending at a third elbow angle to the second elbow portion, and a second portion of said second pair extending at a fourth elbow angle to the second elbow portion, and the first and second portions of the second pair being disposed in respective planes disposed at right angles to one another, disposing a dielectric insulator having a length and a width with the length extending perpendicularly between the elbow portions of the first and second bus bars, the width being no greater than twice the length, and engaging one fastener to couple the dielectric insulator between said bus bars, the dielectric insulator electrically insulating the first and second bus bar from one another.

19. The method of claim 18 further including providing a dielectric insulator including at least one bore and two metal inserts at least partially disposed within the bore, the inserts being noncontiguous within the bore, and first and second fasteners extending from the bore, coupling the first fastener to the first bus bar, and coupling the second fastener to the second bus bar.

20. The method of claim 19 further including inserting the first fastener through a bore in the first bus bar and engaging a first of the two metal inserts disposed within the bore, and inserting the second fastener through a bore in the second bus bar and engaging a second of the two metal inserts disposed within the bore.

\* \* \* \* \*